Feb. 23, 1965     L. E. MILLER     3,170,708
CASTERED CLAMP
Filed Aug. 3, 1962                                                           2 Sheets-Sheet 1
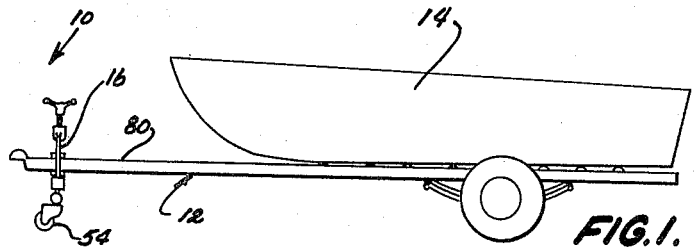
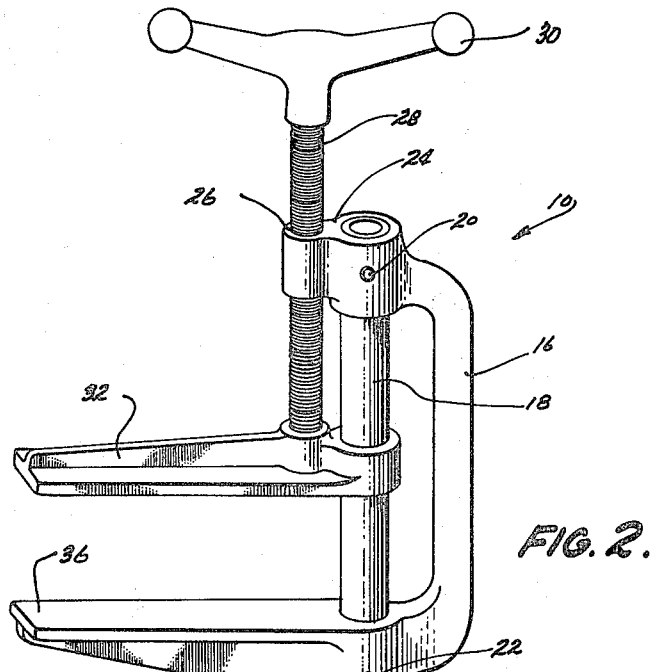
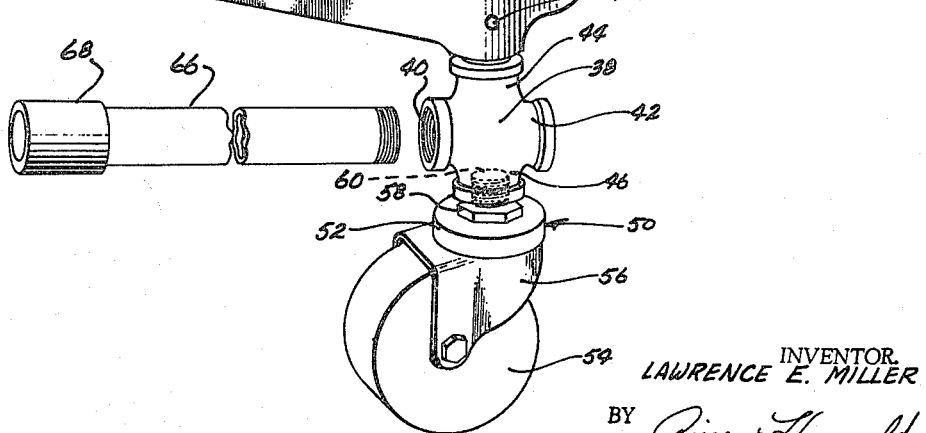
INVENTOR.
LAWRENCE E. MILLER
BY *Price & Heneveld*
ATTORNEYS Feb. 23, 1965    L. E. MILLER    3,170,708
CASTERED CLAMP Filed Aug. 3, 1962    2 Sheets-Sheet 2

INVENTOR.
LAWRENCE E. MILLER
BY
*Price & Heneveld*
ATTORNEYS

United States Patent Office 3,170,708
Patented Feb. 23, 1965

3,170,708
CASTERED CLAMP
Lawrence E. Miller, 2814 Dawes Road, Muskegon, Mich.
Filed Aug. 3, 1962, Ser. No. 214,577
4 Claims. (Cl. 280—47.32)

This invention relates to a mobile clamping support comprising a castered clamp, and more particularly to a support device adapted to mobilize an article to which it is clamped.

Large, cumbersome, heavy articles often impose difficulties in moving them from place to place. One typical example of this is a boat trailer having a heavy boat mounted thereon. To move such a structure, one has to bend over and lift on the trailer by the tongue to a generally level position, and simultaneously push or pull the boat and trailer while steering it to the desired location.

Such articles are not only heavy to move, but are moreover dangerous for playing children, since the trailer tends to tip readily around the wheels and create a dangerous situation when the tongue comes flying down again. Moreover, it is often desirable to have a trailer tongue support that will hold the trailer level without fear of the tongue being bumped from the support to be bent or to cause injury.

When attempting to move a boat without a trailer, the problem becomes even more acute. Usually, several persons are required to lift all portions of a boat, due to its weight and size. This same difficulty occurs with other large objects such as platform-type structures, large panels, etc.

It is an object of this invention to provide a clamping support capable of being readily attached to objects to maintain them at a desired height. The clamping support is capable of being attached to horizontally extending components and equally as easily to vertically extending components.

It is another object of this invention to provide a clamping support adapted to mobilize large, heavy objects. It enables the support of a trailer tongue, for example, to allow the trailer, even when loaded, to be moved from place to place with no lifting and with only slight effort. It is also capable of supporting the tongue in an elevated position without allowing the tongue to be accidentally bumped off the support, as with conventional blocks used to hold the tongue level.

It is still another object of this invention to provide a clamping support wherein several supports are attachable to large heavy objects such as a boat or a panel, allowing movement of the object without lifting and with only one person being required.

These and several other objects of this invention will be apparent upon studying the following specification in conjunction with the drawings, in which:

FIG. 1 is a perspective view of the novel clamping support showing its use on a boat trailer;

FIG. 2 is an enlarged, perspective view of the novel clamping support;

Figure 3:
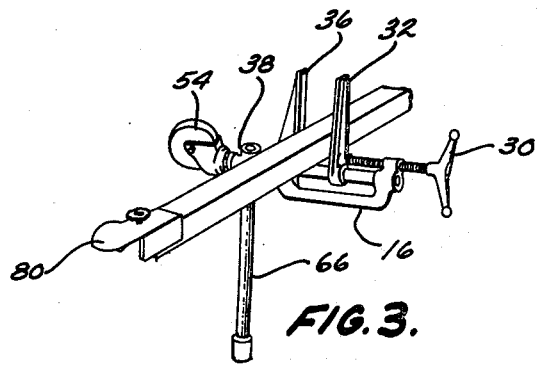
FIG. 3 is a fragmentary, perspective view of the novel support shown used in a different manner on the tongue of a trailer.

Basically, the inventive support comprises a support body, a clamp on the body, and a roller element on the body. The body includes an elongated member, a generally U-shaped bracket secured to the elongated member, forming one fixed jaw of the clamping device and forming a socket for a screw shaft. A movable jaw controlled by a screw shaft extending through the socket is slidably mounted on the elongated member as to enable the two jaws to cooperate for a clamping action. On the lower end of the elongated member is preferably a multiple connection coupling to which a standard support leg or comprising a roller means is attached in one of the several positions.

Referring to the drawings, in FIG. 1 the novel support 10 is shown utilized in combination with a boat trailer 12 upon which boat 14 is mounted.

In FIG. 2 the detailed structure of the support mechanism 10 is shown more clearly. It includes a generally U-shaped bracket 16, and an elongated section of pipe 18 extending between the ends of the bracket and beyond the lower end of the bracket. This pipe may be secured to the ends of the bracket by suitable set screws 20 and 22. The upper end of the bracket includes a boss 24 which has a threaded socket 26 extending therethrough to receive the drive screw 28. On the upper end of the drive screw is a handle 30. The lower end of the drive screw is rotatably secured to the movable jaw 32 of the clamping device. The inner end of the movable jaw is slidable along the elongated pipe 18 to cooperate with the fixed jaw 36, which is preferably formed as an integral part of bracket 16. It will be noted that bracket 16 also forms a general handle for the complete support device.

Mounted to the lower end of elongated member 18 beyond the end of the bracket 16 is a multiple-connection fitting 38 here shown to be a pipe fitting known as a "cross." In the form shown, this pipe fitting is threadably secured at its connection 44 to the end of pipe 18. The pipe fitting also includes connections 40 and 42 in the horizontal plane, and 46 in the vertical plane.

A standard shown in the form of a roller element or wheel caster 50 is removably secured in connection 46. This caster 50 may include a suitable bearing housing 52, wheel 54, bracket 56, and stop nut 58 on threaded stud 60. Also shown in FIG. 2 is a standard in the form of a leg 66 which may be threadably inserted in any of the connections of cross 38. It may be a section of pipe, and preferably includes a coupling 68 on the outer end. This coupling may receive the threaded stud 60 of caster 50 if desired. By removing the caster from connection 46 and inserting it directly on connection 42 or 40, or in coupling 68, the jaws 32 and 36 of the clamping means can be shifted from a horizontal orientation to a vertical orientation to suit the particular article to be supported. As is illustrated in FIGS. 1, 3, 4 and 5, the support may be used in a variety of ways.

In FIG. 1 it is shown with the clamping means in a horizontal direction clamped onto tongue 80 of trailer 12, with wheel 54 on the ground or surface. Thus, by grasping the handle or bracket 16, or by pulling directly on tongue 80 of the trailer, the boat and trailer may be readily moved from place to place with little effort. It may also be stored this way indefinitely until ready for use again. Due to the vise-grip action of the clamping jaws operated by the drive screw, the tongue is held very securely and does not break loose from te clamping means during movement.

Instead of the rolling action shown in FIG. 1, the clamping means may be used with jaws 32 and 36 in a vertical direction as illustrated in FIG. 3. Here tongue 80 of the trailer is shown clamped between the vertical jaws and resting upon leg 66 mounted in cross 38. This type of assembly prevents movement of the trailer around on the surface and retains the trailer at the desired height during a storage period, for example.

Figure 4:
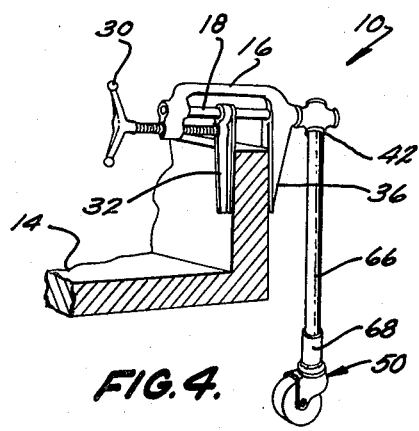
FIG. 4 is a fragmentary sectional view taken at the rear of a boat to show the clamping support secured to the vertical rear panel.

FIG. 4 illustrates the mobilizing support in a still different fashion. Here boat 14, for example, is moved by using a plurality of support members 10. To do so, leg 66 is secured in one of the side connections 42. The caster 50 is unscrewed from connection 46 and screwed into the coupling 68 so that jaws 32 and 36 of the support 10 are oriented vertically and downwardly. A clamping action is made to the boat by rotating handle 30. This causes screw shaft 28 to move progressively through socket 26 of the bracket 16, thereby causing movable jaw 32 to slide down cylindrical guide 18 to clamp the vertical panel of the boat 14 securely between the jaws. By affixing three or four of these supports around the boat, it will be completely mobilized, so that it can be readily moved about in a garage, basement, etc.

Figure 5:
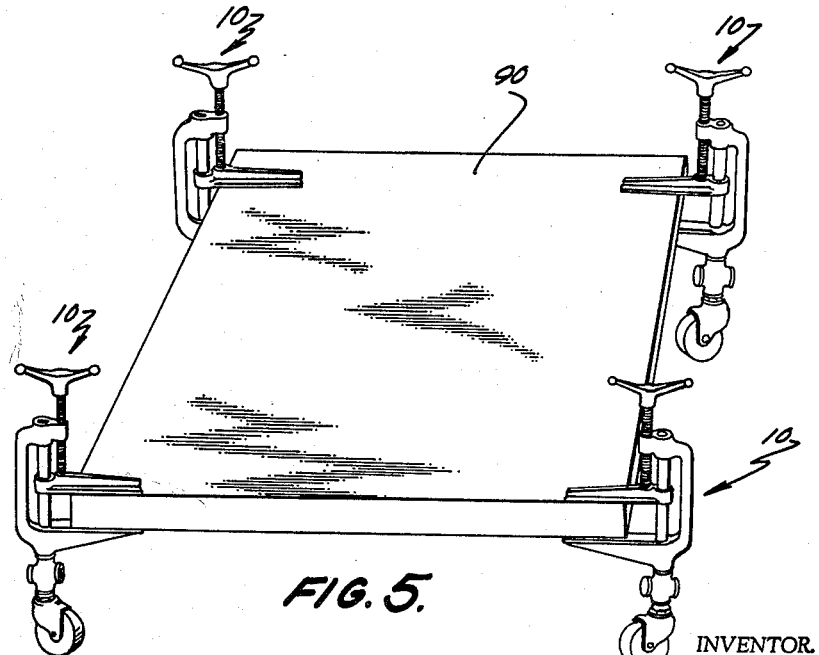
FIG. 5 is a perspective view showing a plurality of clamping supports mounted around a platform or panel to enable it to be moved about readily.

Another possible use of the novel clamping device is illustrated in FIG. 5. A heavy panel 90 is here mobilized by a plurality of four supports 10, one secured adjacent each corner of the panel 90. This may be done by lifting one corner of the panel at a time, and screwing handle 30 until the movable jaw 32 and fixed jaw securely clamp the panel therebetween.

After studying the foregoing forms of the combination, certain obvious modifications may occur to those in the art within the principles of the invention as taught. These obvious modifications are deemed part of this invention, which is to be limited only by the scope of the appended claims and the reasonably equivalent structures to those defined therein.

I claim:

1. A support device adapted to mobilize an article to be supported comprising: a generally U-shaped bracket; an elongated member extending between the ends of said bracket and beyond one end thereof; one end of said bracket forming a fixed clamping jaw; a second clamping jaw having a collar movable along said elongated member, and cooperable with said fixed jaw to form an open mouth; the end of said U-shaped bracket opposite said one end forming a threaded socket; a jaw operating screw shaft rotatably connected to said movable jaw and extending through said threaded socket; and a rollable standard mounted to said member end extending beyond said bracket.

2. A mobilizing article support comprising: a section of pipe; a multiple connection pipe fitting secured to one end of said pipe; a bracket secured to said pipe; said bracket having a fixed clamping jaw on one end and having a screw-shaft socket on the other end; said pipe extending between said bracket ends, parallel to said socket; a movable clamping jaw in engagement with and slidable along said pipe; a screw shaft extending through said socket parallel to said pipe and rotatably connected to said movable jaw to create an open mouth clamping action between said jaws; and a standard connected to said fitting in one of said multiple connections.

3. A mobilizing article support comprising: a section of pipe; a multiple connection pipe fitting secured to one end of said pipe; a bracket secured to said pipe; said bracket having a fixed clamping jaw on one end and having a screw-shaft socket on the other end; said pipe extending between said bracket ends, parallel to said socket; a movable clamping jaw in engagement with and slidable along said pipe; a screw shaft extending through said socket parallel to said pipe and rotatably connected to said movable jaw to create an open mouth clamping action between said jaws; and a wheel connected to said fitting in one of said connections.

4. A support device to mobilize an article with attachment to the article comprising: a pipe; a C-shaped bracket mounted to said pipe with one leg of the C extending beyond said pipe to form a fixed jaw; the other leg of said C having a threaded socket; said pipe extending between said bracket legs, parallel to said socket; a movable jaw having a collar slidable on said pipe between the legs of said C; a screw shaft engaged in said threaded socket and rotatably engaged to said movable jaw parallel to said pipe; said screw shaft including a handle for adjusting said movable jaw by rotation of said screw shaft to cooperate with said fixed jaw to form an open mouth; the lower end of said pipe extending beyond said C-shaped bracket and having a multiple connection pipe fitting on said lower pipe end; and a castor wheel attached to said fitting.

References Cited in the file of this patent

UNITED STATES PATENTS

| | | |
|---|---|---|
| 279,481 | Eyster | June 12, 1883 |
| 496,285 | Stely | Apr. 25, 1893 |
| 520,988 | Harrington | June 5, 1894 |
| 770,058 | Foster | Sept. 13, 1904 |
| 946,842 | Haas | Jan. 18, 1910 |
| 2,137,560 | Anderson | Nov. 22, 1938 |
| 2,624,591 | Choplin | Jan. 6, 1953 |
| 2,709,084 | Nagaishi | May 24, 1955 |